April 24, 1956  J. R. JASSE  2,742,783
ANEMOMETRIC DEVICE
Filed May 12, 1953  3 Sheets-Sheet 2
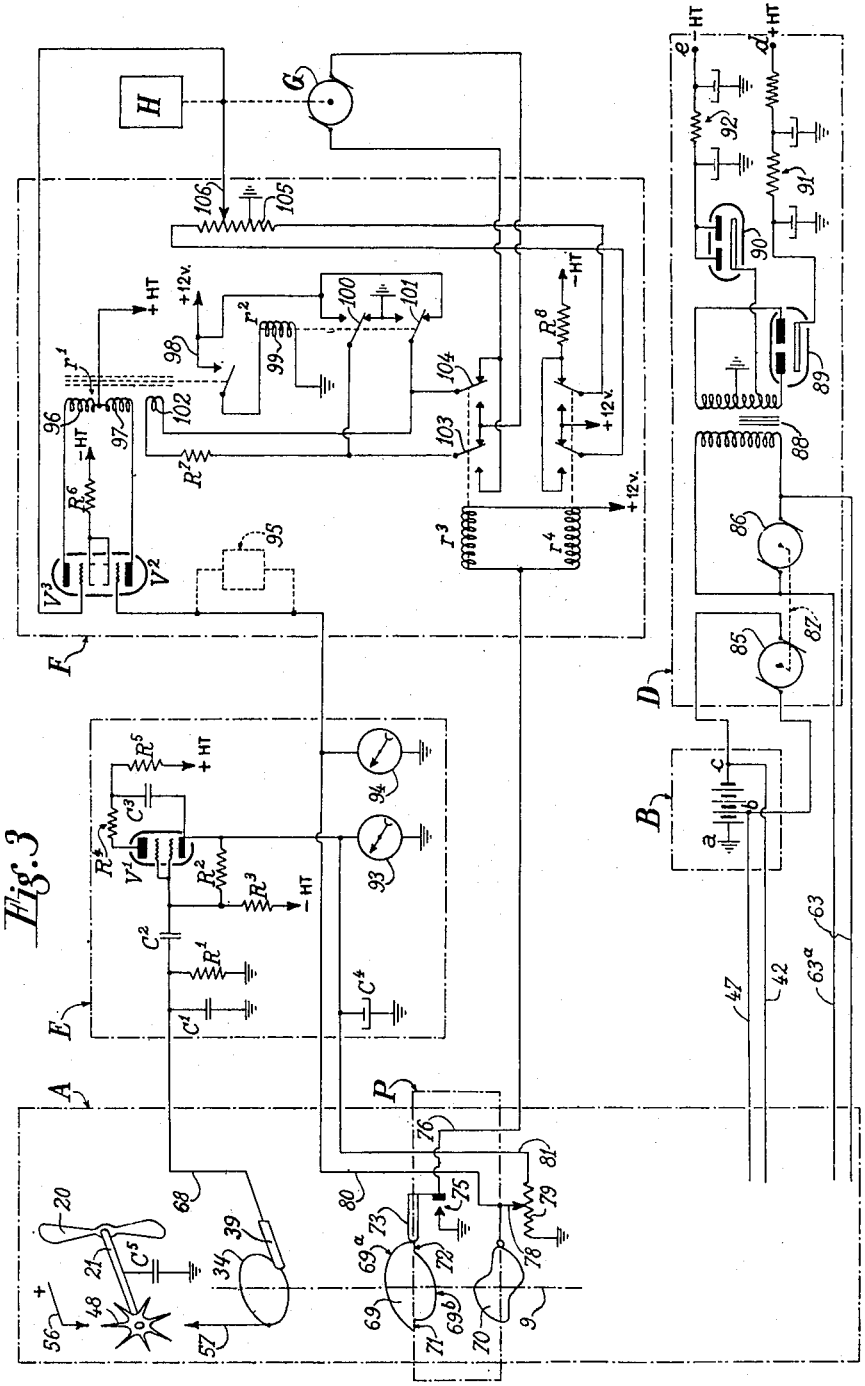
Inventor:
Joseph Raymond Jasse
by: J. Delatter Segues
  Attorney April 24, 1956  J. R. JASSE  2,742,783
ANEMOMETRIC DEVICE
Filed May 12, 1953  3 Sheets-Sheet 3
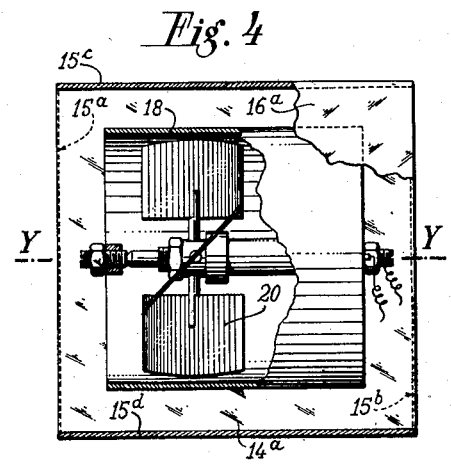
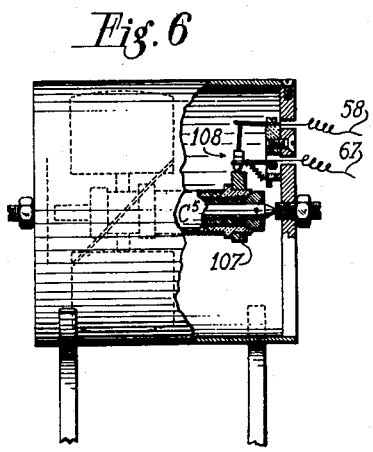
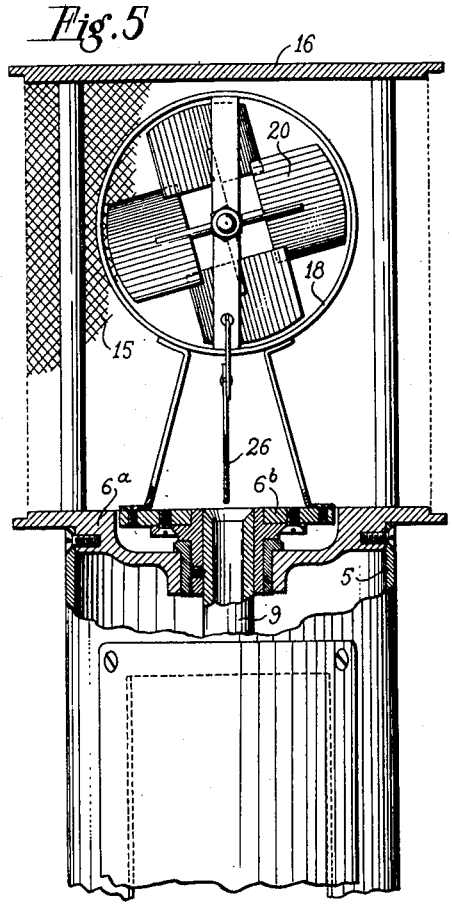
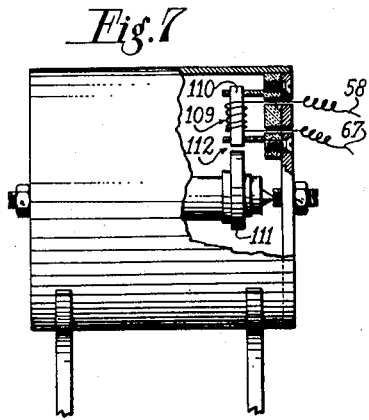
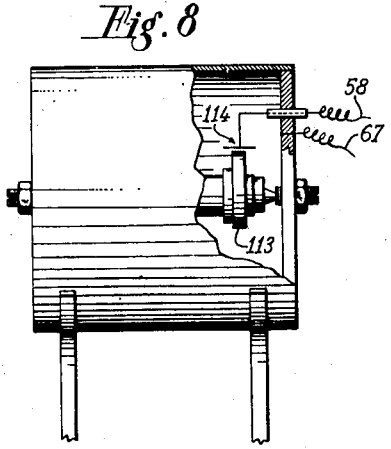
Inventor:
Joseph Raymond Jasse
by: J. Delattre Seguy
Attorney United States Patent Office 2,742,783
Patented Apr. 24, 1956

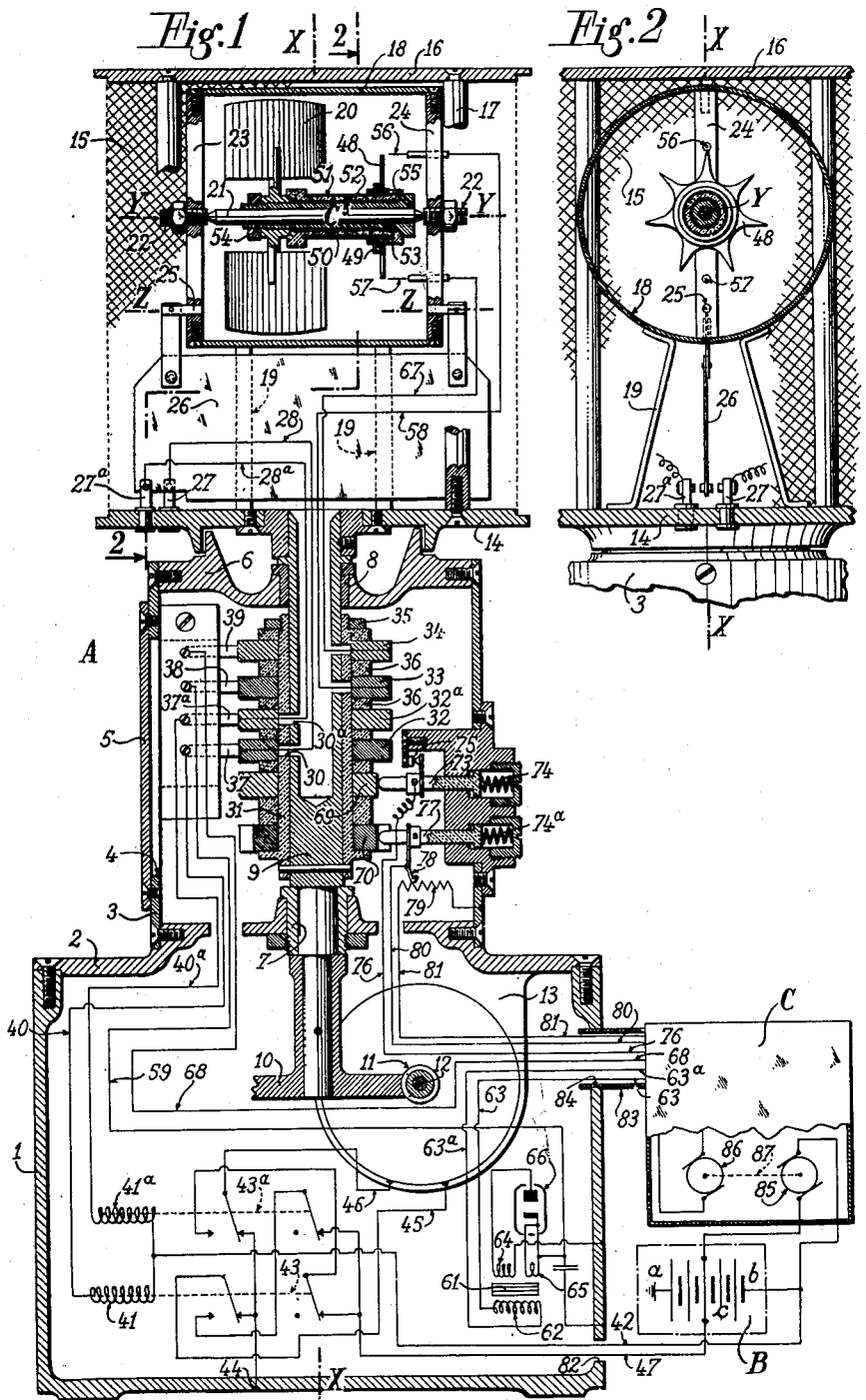

2,742,783

ANEMOMETRIC DEVICE

Joseph Raymond Jasse, Paris, France, assignor to Societe Nouvelle des Etablissements Brandt, Paris, France, a French body corporate Application May 12, 1953, Serial No. 354,532

Claims priority, application France May 14, 1952

21 Claims. (Cl. 73—189)

The present invention relates to anemometric devices with which it is possible to determine the speed and direction of the wind, and in particular to the known meteorological type of anemometric devices which provide an electric current the voltage of which is proportional to the wind speed.

The object of the present invention is to provide an improved device of the latter type which is of use not only in meteorology but in the control of various devices and apparatuses such as, for example, the control surfaces on flying machines, rudders on ships, and tightening devices for tension cables or electric cables.

A particular object of the invention is to provide an improved anemometric device which is simple in construction, automatic, very accurate, and which is continuously, and instantaneously responsive in that the slightest variations in the direction or speed of the wind are detected in the form of proportional variations of given indications.

A further object of the present invention is to provide an anemometric device having an anemometric head which is orientable and therefore capable of being pointed into the wind, this head comprising a cylindrical casing open from one end to the other and orientable about an axis perpendicular to its own axis, a wind wheel or rotor rotatively mounted in this cylindrical casing along the axis of the latter and a head directing or orienting vane pivoted to this cylindrical casing.

Yet another object of the invention is to provide an anemometric device wherein the shaft of the wind wheel provided in the anemometric head is integral with a modulating device adapted to modulate an electric current by emitting electric pulses or signals at a frequency which is proportional to the speed of the wind in a direction parallel to this shaft, this head being combined with a frequency meter which is connected to this modulating device and is adapted to give a voltage proportional to this frequency, and comprises at least an indicator device which is responsive to this voltage and indicates the speed of the wind.

Other features and advantages of the invention will be apparent from the ensuing description.

In the accompanying drawings, given by way of example:

Fig. 1 is a view of the general assembly of an anemometric device improved in accordance with the invention, the anemometric head being shown partly in vertical section and partly in elevation, while the devices combined therewith are represented diagrammatically, Fig. 2 is a vertical cross-sectional view on line 2—2 in Fig. 1, Fig. 3 is a diagram of the electromechanical, electromagnetic, and electronic devices with their connections, with the exception of the electromagnetic device connecting the wind wheel of the head with the orienting vane, which device is represented in Fig. 1, Fig. 4 is a sectional view through the axis of the wind wheel of a first modification of the upper part of the head of the anemometric device.

Fig. 5 is a vertical sectional view of another modification of the upper part of the head of the anemometric device, and Figs. 6 to 8 are partial sectional views of modifications of the head of the device showing various embodiments of devices whereby electric pulses having frequencies which are proportional to the speed of the wind are produced.

I. *Description of the embodiment represented in Figs. 1 to 3*

In this embodiment the anemometric device is composed of the combination of: an anemometric head A provided with a wind wheel or rotor which is automatically pointed into the wind; a source B of electric current; and in a preferred embodiment, disposed inside a casing C (Fig. 1), an assembly of electromechanical and electromagnetic devices which include (Fig. 3):

(a) An electrical device D for providing various supply voltages from the source B.

(b) A frequency meter E, for providing an electric current having a voltage which is proportional to the frequency of the electric pulses, which frequency depends on the speed of the wind passing through the head A. This frequency meter is provided with indicator devices which give the velocity of the wind and its component in another direction.

(c) A computing and follow-up device F for controlling, as a function of the velocity and direction of the wind with respect to a reference direction, the electric supply to a reversible motor G adapted for driving any device H the position of which must be modified as a function of variations in wind velocity and direction.

The invention has, of course, many applications, especially in meteorology where the foregoing indicator devices complete the apparatus. In other applications, the device H might comprise, for example:

(a) A directing or sighting apparatus where the direction in which it is pointed must be corrected according to wind speed and direction.

(b) An apparatus for changing the course of an aircraft, or ship, etc.

(c) An apparatus for automatically regulating the tension of a supporting cable, or an electric cable, according to wind speed and direction.

Each of the sub-assemblies A to F will now be described.

(a) *Anemometric head A.*—It comprises a fixed part formed from the combination of a hollow stand 1, a cover 2 fixed to this stand, a casing 3 provided with an inspection opening 4 ordinarily closed by means of a plate 5, and a top member 6 fixed to the casing 3. The cover 2 and the upper wall or top member 6 include bearings 7 and 8 in which is journalled a shaft 9 having an axis XX. At its lower end, inside the stand 1, this shaft is connected, by means of a worm wheel 10 and a worm 11, to a shaft 12 of a reversible electric motor 13. At the upper end of the shaft 9, above the fixed part of the head, is fixed a base plate 14, which constitutes the lower part of a protective cage including a cylindrical perforated wall 15 and a top plate 16 which is connected to the base plate 14 by means of posts 17. The perforated wall 15 may consist of wire netting, expanded metal, or any other like structure of metal or other material which affords protection to the devices disposed in this cage without offering material resistance to the passage of the wind therethrough. Within the cage is housed a cylindrical casing 18 whose axis YY is perpendicular to the axis XX. This cylindrical casing in fixed to the base plate 14 of the protective cage by means of feet 19 so that it and the members attached thereto take part in the rotation of the cage about the axis XX caused by the rotation of the shaft 9 driven by the motor 13.

Within the cylindrical casing 18 is disposed a wind wheel or rotor 20 having helicoidally disposed vanes or like members. This wind wheel is constructed advantageously of light metal or other light material so as to reduce to a minimum its moment of inertia; for this wind wheel must be as sensitive as possible to changes in wind speed. It is keyed on a shaft 21 having an axis YY. The ends of this shaft are tapered and are journalled in two needle bearings or sockets 22 screwed into the mid-points of diametral cross-pieces 23 and 24 fixed to the ends of the cylindrical casing 18. There is suspended from this cylindrical casing 18, by means of pivots 25, a vane or flap 26. The axis ZZ of the pivots must lie in a plane parallel to the axis of rotation YY of the wind wheel and the axis XX, but may lie in any direction relative to the horizontal. On either side of the mean position normally occupied by the vane 26 due to the action of gravity or of a return spring (in the case of an astatic vane), the base plate 14 carries two insulated contact studs 27 and 27$^a$ with either one of which the vane 26 comes into contact when deviating from its mean position as the result of the action of the wind when the latter veers to the right or left relative to the vertical plane through the axis YY. Conductors 28 and 28$^a$ lead from these studs 27 and 27$^a$ through openings 30 and 30$^a$, provided in the shaft 9 and in an insulating sleeve 31 surrounding this shaft, and are connected to contact or slip rings 32 and 32$^a$. These contact rings 32 and 32$^a$ are mounted on the sleeve 31 together with two other rangs 33 and 34, the series of rings being clamped together by means of a nut 35 and insulating collars 36 interposed between the rings. Brushes 37, 37$^a$, 38 and 39 bear against the rings 32, 32$^a$, 33, and 34 respectively. The two brushes 37, 37$^a$ which the conductors 28 and 28$^a$ connect to the studs 27 and 27$^a$ respectively, are also connected by conductors 40 and 40$^a$ to one of the ends of one or other of two relay coils 41 or 41$^a$. The other two ends of these coils are connected by a single conductor 42 to the positive terminal of the electric supply so that one or other of these relays is energized, the relay energized depending on whether the wind causes the vane 26 to enter into contact with the stud 27 or the stud 27$^a$, since the vane 26 is electrically connected to the body of the device, i. e. to ground, by the cylindrical casing 18 and its support. The two relays control two reversing switches 43 and 43$^a$ which have opposite polarity, are grounded at 44, and are connected to the terminals of the motor 13 by two conductors 45 and 46 and to an intermediate tapping C of the electric supply B by another conductor 47. Thus while the vane 26 is separated from the two studs 27 and 27$^a$ (which signifies that the plane through the axes ZZ and YY is parallel to the direction of the wind) the relays 41 and 41$^a$ are not energized and the reversing switches 43 and 43$^a$ are in the illustrated position (Fig. 1) and as the motor terminals are grounded it does not operate. However, as soon as the wind veers towards one side or the other of this plane through the axes ZZ and YY, the vane swings about the axis ZZ and, in coming into contact with the stud 27 or 27$^a$, causes the relay 41 or 41$^a$ to be energized, which relay closes one of the two reversing switches 43 and 43$^a$. This closed switch supplies a current to the motor 13 in one direction or the other and causes the motor to rotate and drive in rotation the anemometric head about the axis XX in a direction to bring the plane through the axes XX and YY once more parallel to the direction of the wind, which results in the release of the contact between the vane 26 and the stud 27 or 27$^a$, as the case may be, and causes the motor to cease rotating. With this particular arrangement of the vane 26 and the electrical devices it is possible to point automatically, exactly, and at each instance of wind change the axis YY of the wind wheel into the wind so that the rotative speed of this wind wheel is an exact function of the horizontal component of the wind velocity, if the axis YY is horizontal, as it would be in normal constructions.

In order to record or determine the magnitude of this horizontal component of the wind velocity the wind wheel 20 and its shaft 21 are combined with a modulating device which includes a conductive star 48 which has an odd number of radial, pointed and equispaced arms or branches (for example, seven). This star is fixed on the shaft 21 through the medium of a device constituting a ceramic capacitor $C^5$, one electrode of which is connected to the star 48 whereas the other is grounded through the shaft 21. The star 48 includes a sleeve 49 encompassing a ceramic bush 50 coated over its outer and inner faces with a silver layer 51 or 52 or other metallic layer, which layers constitute the two electrodes of the capacitor, the bush 50 being of course the dielectric. The sleeve 49 of the star 48 is in contact with the layer 51, while the inner layer 52 is in contact with a metal tube 53 encompassing the shaft and held to the latter by means of, for example, longitudinal slits and a nut 54 which tightens the capacitor and the wind wheel 20 against a conical seating 55 provided at the other end of the tube 53.

The star 48 cooperates with two conductive points 56 and 57 fixed on the cross-piece 24 of the cylindrical casing 18 (this cross-piece is made of an insulating material). The points are symmetrically disposed about the axis YY in such manner that their ends are immediately adjacent to, but do not intersect, the transverse plane containing the branches of the star 48. Thus, when a branch passes by the point 56, the point 57 is situated mid-way between two other branches, and vice versa. The point 56 is at a high potential, for example of the order of 4000 volts. It is connected by a conductor 58 to the ring 33 on which rubs the brush 38 which a conductor 59 connects to a voltage rectifying and transforming device, of which the primary 62 is connected by conductors 63 to the feed device D (Fig. 3) housed in the casing C (Fig. 1), whereas the secondaries 64 and 65 feed a rectifying valve 66, for example of the type EY51. The other point 57 is connected by another conductor 67 to the ring 34 on which rubs the brush 39 of a conductor 68 connected to the device C. Hence, when a branch of the star 48 passes before the point 56 at high potential a spark is produced and the capacitor $C^5$ charges through the medium of the star. It discharges when, the star having continued to rotate, another branch arrives in front of the point 57 connected to the frequency meter E (housed in the casing C). This frequency meter E receives through the conductor 68 a current modulated at a frequency which is proportional to the wind velocity in the plane through the axis YY. It will be observed that the disposition of the two points 56 and 57 is such that these two points are never adjacent or face two branches of the star at the same time. Thus if, when there is no wind, one of the branches is situated opposite the point 56 it cannot produce a succession of sparks at a high rate (as occurs when the wind wheel rotates at high speed). This would have occurred if the conductor 68 had been connected directly to the wind wheel.

The anemometric head is completed by two cams 69 and 70 fixed on the shaft 9 in the same way as the rings 32—34. The cam 69 has two semi-circular portions 69$^a$ and 69$^b$ which have different radii and are connected at 71 and 72 at two diametrically opposite points (see Fig. 3). This cam cooperates with a movable member or follower 73 which is biassed against the cam by a spring 74 and carries the movable stud of a switch 75. The movable stud is connected by a conductor 76 to the device C, and the fixed stud is grounded. The follower 73 and the cam 69 are arranged in such manner about the axis XX that the steps 71 and 72 pass by the follower 73 at the moment when the direction of the wind in plan coincides with a given or pre-determined reference plane P (Fig. 3).

The other cam 70 is what will be hereinafter termed a "sine" cam and a spring 74a biasses against this cam a second follower 77 carrying the slider 78 of a potentiometer 79. The slider 78, insulated from the ground, is connected by a conductor 80 to the follow-up device or servomechanism F, and the resistor 79 has one end grounded and the other end connected by a conductor 81 to the frequency meter E. This cam is so arranged as to change the position of the slider 78 on the resistor 79 proportionally to the absolute cosine or sine value of the angle the reference plane P makes with the direction of the wind, depending on whether the longitudinal component of the latter (i. e. that lying in the reference plane P) or the transverse component of the latter (i. e. that perpendicular to the plane P) is to be taken into account.

Eight conductors lead out of the stand 1, i. e. conductors 47, 42, 63, 63a, 68, 76, 80, and 81. The conductors 42 and 47 feeding the motor 13 lead out of the stand 1 through the opening 82, and the remaining conductors are contained in one cable 83 which leads out of the stand 1 through another opening 84.

(b) *Electric source B.*—It comprises a battery having a voltage of 24 volts across the terminals a and b. The terminal a is grounded and a lead is taken off at point c where the voltage is, say, twelve volts. The conductors 47 and 42 pertaining to the motor 13 are connected to the terminals c and b respectively.

(c) *Unit C.*—This unit, which is housed in a case, comprises, as hereinbefore mentioned, a high voltage feed device D, a frequency meter E, and a follow-up, computing, transmitting, and exploiting device F.

(d) *Feed device D.*—This device (see Fig. 3) comprises a convertor composed of the motor 85, connected to the terminals b and c of the source B, and an A. C. generator 86 whose rotor is coupled to the shaft 87 of the motor 85.

To the terminals of the generator 86 are connected:

The feed conductors 63 and 63a of the rectifier-amplifier 61—66 adapted to give the high voltage at the point 56; and The primary of a transformer 88 the secondary of which feeds two rectifying valves 89 and 90, for example of the type 6X4, adapted to give, in combination with the usual filters 91 and 92, the following voltages relative to the ground of zero voltage.

At the terminal d, a high voltage +HT equal, for example, to 150 volts.

At the terminal e, a voltage −HT equal, for example, to −100 volts.

(e) *Frequency meter E.*—The conductor 68, which is connected to the point 57, is also connected to ground through a capacitor $C_1$ and a resistor $R_1$ and is, moreover, connected, through a capacitor $C_2$, to the two grids of a thyratron $V_1$ tetrode (for example of the type 2D21). These grids are also connected to the cathode of the thyratron by a resistor $R_2$, and to the −HT (−100 volts) by a resistor $R_3$. The cathode of the thyratron is grounded by the potentiometer 79, a capacitor $C_4$, and a voltmeter 93. The anode of the thyratron is connected to the high tension (+150 volts) by two resistors in series $R_4$ and $R_5$. A capacitor $C_3$ connects the common connection of these two resistors to the cathode of the thyratron.

(f) *Follow-up device or servomechanism F.*—The slider 78 of the potentiometer 79 (the sine potentiometer) is connected to ground by a voltmeter 94 of the frequency meter, and to the grid of a triode $V_2$ either directly (as represented in full line) or through a dipole 95 (as represented in dotted line), which permits the voltage applied across this grid to be modified according to a law depending on the characteristics of the dipole. The triodes $V_2$ and $V_3$ constitute a double triode (for example of the type 12AU7) whose two cathodes are connected together and to the −HT by a resistor $R_6$. The anodes of these triodes are connected to the two coils 96 and 97 of a polarized relay $r_1$. The ends of these coils not connected to the anodes of the double triode are both connected to the high tension +HT, the connections being such that the fields produced in the two coils of the relay by the anode currents from the two triodes $V_2$ and $V_3$ are in opposition. The contact 98 of this polarized relay $r_1$ connects the +12 volts to the coil 99 of a relay $r_2$, which has two reversing switches 100 and 101 arranged in such manner that the +12 volts and the ground are respectively connected to the two contact blades of this relay in one direction when it is not energized and in the opposite direction when it is energized. These two blades are also connected to the two blades 103 and 104 of a relay $r_3$, energized, together with a further relay $r_4$, by the +12 volts across the contact 75 controlled by the cam 69 which opens the contact 75 when the wind comes from the right relative to the reference plane P. The relay $r_3$ is also adapted to reverse the polarity, and is connected to the two poles of the motor G which drives the device H whose position or direction is to be changed in accordance with the speed and direction of the wind. The relay $r_4$ is also a polarity reverser, and the directions in which the +12 volts and the negative voltage −HT (across a resistor $R_8$) are applied to the two ends of a potentiometer 105 depend on whether the relay $r_4$ is or is not energized. The slider 106 of this potentiometer is driven by the motor G, so that its movement is related to that of the driven device H. The slider 106 is connected to the grid of the triode $V_3$.

By way of example, good results have been obtained with the above mentioned valves by utilizing the following values for the resistors, capacitors, and potentiometers:

| | | |
|---|---|---|
| $R_1$ | ohms | 2000 |
| $R_2$ | do | 510000 |
| $R_3$ | megohms | 10 |
| $R_4$ | ohms | 50 |
| $R_5$ | do | 27000 |
| $R_6$ | do | 25000 |
| $R_7$ | do | 300 |
| $R_8$ | do | 7000 |
| $C_1$ | microfarads | 0.05 |
| $C_2$ | do | 0.01 |
| $C_3$ | do | 0.05 |
| $C_4$ | do | 50 |
| $C_5$ | do | 0.0005 |
| Potentiometer 79 | ohms | 5000 |
| Potentiometer 105 | do | 2 x 400 |

II. *Operation of the complete anemometric device*

The operation of the head A will not be described, since the operation and function of its various component parts have already been discussed.

The operation of the frequency meter E, the servomechanism F, and the reversing system for taking into account the winds coming from the left will be examined separately.

It will be recalled that when a branch of the star 48 passes sufficiently near the fixed point 56 having a potential of 4000 volts, a spark or a series of sparks occur which charge the capacitor $C_5$ surrounding the shaft 21. Since the wind wheel 20 and the star continue to rotate, a branch of the star passes near the fixed point 57 and a spark discharges the capacitor $C_5$ into the capacitor $C_1$ which in turn gradually discharges into the resistor $R_1$. Hence, well-defined pulses or signals corresponding to the passage of the branches of the star 48 in front of the point 57 are received across the terminals of the capacitor $C_1$. The capacitor $C_2$ transmits these pulses to the grids of the thyratron $V_1$. Ordinarily the thyratron $V_1$ is polarized by the voltage divider constituted by the two resistors $R_2$ and $R_3$, so that when the potential of the cathode of the thyratron changes, the polarization of the latter remains more or less constant. As soon as the grids of this thyratron receive a pulse it ionizes, and the capacitor C₃, charged at the normal rate by the high tension across the resistor R₅, discharges across the resistor R₄ and across the thyratron (this resistor R₄ constitutes a protective device which limits the current in the thyratron to a safe value). After each discharge the capacitor C₃ is recharged by the +HT across the resistor R₅. The recharging current passes through the potentiometer 79 back to ground. Since, as a first approximation, the quantity of electricity that charges the capacitor C₃ is always the same, the mean current in the potentiometer 79 is proportional to the number of discharges per second, i. e. the rotative speed of the wind wheel 20. The mean voltage across the potentiometer 79 is therefore proportional to this speed. The capacitor C₄, which is connected in parallel with this potentiometer, allows practically the whole of the alternating component of the recharging current of the capacitor C₃ to pass through. Hence, across the terminals of the capacitor C₄ and, similarly, across the terminals of the potentiometer 79, there exists a voltage which is proportional to the speed of the wind and is substantially constant. The voltmeter 93 may therefore be graduated, therefore, directly in values of wind speed.

The slider 78 of the potentiometer 79 is controlled by the cam 70. This cam has such shape that there is obtained at the slider position a voltage which is reduced to a value which is proportional to the absolute value of the cosine (or sine) of the angle the direction of the wind makes with the reference plane P.

The operation of the servomechanism F will now be considered, it being assumed that the wind is coming from the right relative to the direction of the reference plane P. The relays r₃ and r₄ will not, therefore, be energized (condition represented in Fig. 3). Since the double triode V₂, V₃ has its two cathodes connected together and to the —HT by a resistor R₆, the sum of the currents from the two triodes is, as a first approximation, constant because the distribution of the currents from the two triodes only depends on the difference in potential of the two grids. As the coils 96 and 97 of the relay r₁ are in opposition, this relay is or is not energized according as the potential of the grid of V₃ is greater or less than that of the grid of V₂. If the relay r₁ is energized, the relay r₂ is energized, and the 12 volts are applied across the motor terminals in one direction which causes the motor G to rotate. Similarly, if the relay r₁ is not energized, the relay r₂ is not energized, and the 12 volts are applied across the motor terminals in the opposite direction and reverse the direction of rotation of the motor. This motor G controls the slider 106 of the potentiometer 105 and so positions it that the potential of this slider is equal (within a small tolerance) to that of the grid of the valve V₂. If the potentiometer is wound linearly, the distance between the position assumed by the slider and the median position is proportional to the voltage indicated by the voltmeter 94, i. e. it corresponds to the component of the wind velocity along the reference plane or in a direction perpendicular to this plane according as the cam 70 is a cosine or sine cam.

However, in reality the operation of the servomechanism is a little more complex. The relay r₂ reacts against the relay r₁ through its coil 102 and the resistor R₇. The purpose of this reaction is to prevent the motor G from making the slider 106 of the potentiometer 105 oscillate about its position of equilibrium. When this slider arrives fairly near its position of equilibrium the assembly of relays r₁ and r₂ oscillates at relatively high frequency and the motor is fed with only a slight vibration or tremble of insignificant amplitude.

If the wind now comes from the left, the contact 75 closes, the relays r₃ and r₄ are energized and the lower part of the potentiometer 105 is now connected to the +12 volts and, the connections of the motor G having been reversed so that the follow-up still occurs, the slider 106 is brought by this motor to a position in the lower part of the potentiometer 105 which corresponds to a rotation of the shaft of this potentiometer in a direction opposite to that in which the shaft rotated when the wind came from the right. The negative voltage (—HT) applied to one part of the potentiometer through the resistor R₈ serves to shift the slider 106 off that part of the potentiometer upon which it should not be. It would happen that the wind drops immediately after having changed direction, and without this voltage the slider 106 would remain on the wrong part of the potentiometer 105, the potential of this slider and the grid of V₂ being zero.

III. Modifications

In Fig. 4 is represented, in elevation with cut-away portion, a modification of the head of the anemometric device in which the protective cage has a square or rectangular horizontal section. The base plate 14ᵃ and the top plate 16ᵃ are connected by two perforated walls 15ᵃ and 15ᵇ disposed perpendicular to the axis YY, and by two partially perforated walls 15ᶜ and 15ᵈ disposed parallel to the axis YY.

In the embodiment shown in Fig. 5, the cage is fixed and its bottom plate forms part of the cover of the casing 5. The cylindrical casing 18 for the wind wheel 20 is fixed to an auxiliary base plate 6ᵇ rigidly secured to the end of the shaft 9. The protective cage does not, therefore, rotate with the wind wheel 20. The wall of this cage must in this case be provided with perforations around the whole of its periphery. The protective cage could, of course, be removed entirely if desired.

Figs. 6 to 8 illustrate modifications of the devices whereby are emitted periodic electric pulses corresponding to the velocity of the wind along the axis of the wind wheel. In Fig. 6, the shaft of the wind wheel carries a cam 107 having one or several bosses controlling a switch 108 connected to a frequency meter which is much simplified.

In the modification shown in Fig. 7, the two conductors 58 and 67 are coupled by a coil 109 provided with a core 110, and the shaft of the wind wheel carries a magnetic member 111 having one or several bosses which serve to modify the air gap 112 and thereby create variations in the inductance of the circuit 58—67.

In Fig. 8, the modification consists of a variable capacitor which varies the capacitance between the conductors 58 and 67. The capacitor is constituted by one electrode 113 mounted on the wind wheel shaft and provided with several bosses which vary the distance between this electrode and another fixed electrode 114.

The invention is not limited to the details of construction herein described and illustrated in the accompanying drawings which have been given merely by way of example. Thus it is obvious that the stand for the anemometric head may be constructed in a manner different from that illustrated. The shaft 21 of the wind wheel may be supported in the cylindrical casing in a manner different from that described.

The frequency meter E may be different from the thyratron type described; for example, it might be constituted by a monostable multivibrator which transforms each pulse emitted by the device responsive to the wind speed into a rectangular signal of constant width which is integrated by means of a resistance-capacitance circuit.

The follows-up device F may include a preamplifying stage between the sliders of the potentiometers 79 and 105 and the grids of the triodes V₂ and V₃, this stage being incorporated in a manner similar to the control stage of the relay r₁, as a symmetrical amplifier of the Loftin-White type.

The single capacitor C₃ may be replaced by a set of commutable capacitors so that the sensitivity of the unit may be adjusted by steps, the fine adjustment being obtained by means of a variable resistance connected in parallel with the potentiometer 79.

The potentiometer 79 controlled by a sine cam may be replaced by any other device permitting any other coefficient of proportionality to be obtained between the voltage and frequency. This coefficient may be constant or variable, a function of any parameter other than the angle between the wind direction and the reference plane P, or a coefficient varying in any way.

If only the velocity of the wind or a component of this velocity in a given direction is required (as in the case of the application of the device in meteorology) the device may be considerably simplified by eliminating the servo-mechanism, the readings being obtained directly from the voltmeters 93 and 94. It will be recalled in this respect that the voltmeter 94 gives only the absolute value of the component of the wind velocity in a given direction; if the algebraic value of this component is required, it will be necessary to employ a relay similar to the relay $r_3$ layout acting as a polarity reverser, using a center zero type voltmeter.

If the velocity components of the wind along two perpendicular directions are required simultaneously, it will be necessary to connect in parallel with the potentiometer 79 a further identical potentiometer controlled by a further cam identical to the cam 70 but mounted on the shaft 9 with a phase lag of 90° relative to the cam 70, with the provision of a second contact identical to contact 75 but operated by a cam mounted on the shaft 9 with a phase lag of 90° relative to the cam 69.

Having now described my invention what I claim as new and desire to secure by Letters Patent is:

1. In an anemometric device, in combination: a hollow support, a reversible electric motor housed in this support, a shaft driven in rotation by this motor and journalled in this support; an orientable anemometric head comprising a hollow cylindrical casing open from one end thereof to the other and fixed on said shaft the axis of the latter being perpendicular to the axis of this cylindrical casing, a wind wheel mounted for free rotation in the cylindrical casing along the last mentioned axis, and an anemometric head orienting vane pivoted on the cylindrical casing and electrically grounded, a polarity reverser included in the feed circuit for said electric motor, two relays controlling this polarity reverser, a source of electrical power connected in parallel with these two relays, and a contactor controlled by said vane and including two insulated contact studs each of which is connected to one of the relays for closing the circuit of one or other of said relays when said vane oscillates to one side or the other of a mean position thereof.

2. Anemometric device as claimed in claim 1, wherein said support comprises a hollow stand containing said motor, a first transverse wall forming a cover plate for said stand, a casing placed on this cover plate and a second transverse wall forming a cover for this casing, said shaft driven in rotation by the motor being journalled in these two transverse walls.

3. In an anemometric device, in combination: a hollow support, a reversible electric motor housed in this support, a shaft driven in rotation by this motor and journalled in this support; an orientable anemometric head comprising a protective cage composed of a base plate fixed to said shaft driven in rotation by the motor, a top plate and a wall connecting said plates, at least the portions of this wall which are transversally disposed relative to the direction of the wind being perforated so as to allow the free passage of the wind therethrough, a hollow cylindrical casing open from one end thereof to the other and fixed to said base plate of the protective cage, the axis of said cylindrical casing being perpendicular to the axis of said shaft, a wind wheel being mounted in said cylindrical casing to rotate freely about the axis of the latter, and an anemometric head orienting vane pivoted to this cylindrical casing and electrically connected to ground; a polarity reverser introduced in the feed circuit of said motor, two relays controlling this polarity reverser, a source of electrical power connected in parallel with these two relays, and a contactor controlled by said vane and including two insulated contact studs each of which is connected to one of the relays for closing the circuit of one or other of said relays when said vane oscillates to one side or the other of a mean position thereof.

4. In an anemometric device in combination: a hollow support; a reversible electric motor housed in this support; a shaft driven in rotation by this motor and journalled in this support; an anemometric head comprising a protective cage of which at least the parts transversally disposed to the direction of the wind are perforated for allowing the passage of the wind therethrough, there being provided in this cage a hollow cylindrical casing open from one end thereof to the other and fixed to said shaft whose axis is perpendicular to the axis of the cylindrical casing, a wind wheel mounted to rotate freely in said cylindrical casing about the axis of the latter, an anemometric head orienting vane pivoted on this cylindrical casing and electrically connected to ground, and a contactor including two insulated contact studs disposed on either side of this vane for being encountered by the latter when it oscillates to one side or the other of a mean position thereof; a polarity reverser included in the feed circuit of said motor; two relays controlling this polarity reverser; a source of electric power, and means for connecting said polarity reverser to the motor and to said source, and for connecting said relays in parallel with said source and each one of these relays to one of said contact studs.

5. Anemometric device as claimed in claim 4, wherein said protective cage is fixed in position.

6. In an anemometric device: a fixed hollow support; an anemometric head mounted on said support, orientable about an axis of rotation, and comprising a hollow cylindrical casing open from one end thereof to the other, the axis of this cylindrical casing being perpendicular to said axis of rotation, a wind wheel having a shaft the axis of which is mounted to rotate freely in and about the axis of said cylindrical casing, and an anemometric head orienting vane pivoted on the latter; a reversible motor housed in said support for rotating said head; electromagnetic means for controlling the feed of said motor as a function of the oscillations of said orienting vane; a current modulating device disposed in said anemometric head and operatively connected to the wind wheel shaft to give electric pulses at a frequency which is proportional to the velocity of the wind parallel to said axis of rotation of said wind wheel; a frequency meter connected to said current modulating device and adapted for giving a voltage proportional to said frequency, and at least an indicating device responsive to said voltage and indicating the value of said wind velocity.

7. A device as claimed in claim 6, wherein said indicating device comprises a voltmeter.

8. Anemometric device as claimed in claim 6, wherein said current modulating device comprises in combination: a metallic star insulated from the ground and fixed on the shaft constituting the axis of rotation of said wind wheel, and a fixed point at a high electric potential and fixed to said cylindrical casing so that in the course of the rotation of the wind wheel the branches of the star pass in front of this point, a source of a fixed high tension electric current being connected to said point.

9. In an anemometric device, in combination: a hollow support; a reversible electric motor housed in this support; a shaft driven in rotation by this motor and journalled in this support; a generator of a high tension current housed in this support; an orientable anemometric head supported by said shaft and comprising a hollow cylindrical casing open from one end thereof to the other and having its axis perpendicular to said shaft, a wind wheel whose shaft is mounted to rotate freely in said cylindrical casing about the axis of the latter, an anemometric head orienting vane pivoted on said cylindrical casing, and a current modulating device adapted for giving electric pulses at a frequency proportional to the velocity of the wind parallel to said wind wheel shaft, this device comprising a metallic star insulated from the ground and fixed on the wind wheel shaft, a capacitor one of the electrodes of which is connected to said star whereas the other is connected to ground, a first fixed point supported by said cylindrical casing and connected to said high tension generator, and a second fixed point fixed to said cylindrical casing, these fixed points being so arranged that when one of them is in front of a branch of said star the other is substantially mid-way between two branches of said star; a frequency meter connected to said second point and adapted for giving a voltage proportional to said frequency; at least an indicating device responsive to said voltage and giving the magnitude of said wind velocity, and an electromagnetic device controlled by said vane for feeding said motor in one direction or the other when said vane swings to one side or the other of the mean position thereof.

10. Anemometric device as claimed in claim 9, wherein said capacitor, combined with said star, is arranged around the shaft of the wind wheel.

11. Anemometric device as claimed in claim 10, wherein a metallic tube is fitted round the wind wheel shaft and said capacitor is constituted by an insulating bush having on its inner and outer faces a metallic coating, the star being in contact with the outer coating and the inner coating being in contact with said metallic tube.

12. In an anemometric device: a fixed hollow support; an anemometric head mounted on said support, orientable about an axis of rotation, and comprising a hollow cylindrical casing open from one end thereof to the other, the axis of this cylindrical casing being perpendicular to said axis of rotation, a wind wheel the axis of which is mounted to rotate freely in and about the axis of said cylindrical casing, and an anemometric head orienting vane pivoted on the latter; a reversible motor housed in said support to rotate said head; electromagnetic means for controlling the feed of said motor as a function of the oscillations of said orienting vane; a current modulating device disposed in said anemometric head and adapted for giving electric pulses at a frequency which is proportional to the velocity of the wind parallel to said axis of rotation of said wind wheel, said current modulating device comprising the combination of a contactor one of the studs of which is fixed while the other is movable, a cam fixed to the wind wheel shaft and adapted to act on said movable stud; a frequency meter connected to said current modulating device and adapted for giving a voltage proportional to said frequency, and at least an indicating device responsive to this voltage and giving the magnitude of said wind velocity.

13. In an anemometric device: a fixed hollow support; an anemometric head mounted on said support, orientable about an axis of rotation, and comprising a hollow cylindrical casing open from one end thereof to the other, the axis of this cylindrical casing being perpendicular to said axis of rotation, a wind wheel the axis of which is mounted to rotate freely in and about the axis of said cylindrical casing, and an anemometric head orienting vane pivoted on the latter; a reversible motor housed in said support to rotate said head; electromagnetic means for controlling the feed of said motor as a function of the oscillations of said orienting vane; a current modulating device disposed in said anemometric head and adapted for giving electric pulses at a frequency which is proportional to the velocity of the wind parallel to said axis of rotation of said wind wheel, said current modulating device comprising the combination of a variable inductance and a magnetic member adapted to act on this inductance, this magnetic member being composed of one piece having at least one boss and fixed to the wind wheel shaft; a frequency meter connected to said current modulating device and adapted for giving a voltage proportional to said frequency, and at least an indicating device responsive to this voltage and giving the magnitude of said wind velocity.

14. In an anemometric device; a fixed hollow support; an anemometric head mounted on said support, orientable about an axis of rotation, and comprising a hollow cylindrical casing open from one end thereof to the other, the axis of this cylindrical casing being perpendicular to said axis of rotation, a wind wheel the axis of which is mounted to rotate freely in and about the axis of said cylindrical casing, and an anemometric head orienting vane pivoted on the latter; a reversible motor housed in said support to rotate said head; electromagnetic means for controlling the feed of said motor as a function of the oscillations of said orienting vane; a current modulating device disposed in said anemometric head and adapted for giving electric pulses at a frequency which is proportional to the velocity of the wind parallel to said axis of rotation of said wheel, said current modulating device comprising a variable capacitor one of the electrodes of which is fixed whereas the other electrode is constituted by a member having at least one boss and fixed on the wind wheel shaft; a frequency meter connected to said current modulating device and adapted for giving a voltage proportional to said frequency, and at least an indicating device responsive to said voltage and giving the magnitude of said wind velocity.

15. In an anemometric device: a fixed hollow support; an anemometric head mounted on said support, orientable about an axis of rotation, and comprising a hollow cylindrical casing open from one end thereof to the other, the axis of this cylindrical casing being perpendicular to said axis of rotation, a wind wheel the axis of which is mounted to rotate freely in and about the axis of said cylindrical casing, and an anemometric head orienting vane pivoted on the latter; a reversible motor housed in said support to rotate said head, electromagnetic means for controlling the feed of said motor as a function of the oscillations of said orienting vane; a current modulating device disposed in said anemometric head and operatively connected to the wind wheel axis to give electric pulses at a frequency which is proportional to the velocity of the wind parallel to said axis of rotation of said wind wheel; a frequency meter connected to said current modulating device and adapted for giving a voltage proportional to said frequency, and at least a calculating device whereby the voltage given by said frequency meter may be multiplied by a parameter.

16. Anemometric device as claimed in claim 15, wherein an indicating device is in parallel with said calculating device.

17. Anemometric device as claimed in claim 15, wherein said calculating device is adapted for multiplying the value of the voltage given by the frequency meter by one of the sine and cosine trigonometrical functions of the angle formed by a given reference direction with the variable direction of the wind.

18. Anemometric device as claimed in claim 17, wherein the calculating device comprises a potentiometer having a slider, the resistor of said potentiometer being connected to ground and to the output end of the frequency meter, a voltmeter connected to said slider and to ground, and a cam for controlling said slider fixed on the shaft from the anemometric head orienting motor and so shaped as to correspond to one of the sine or cosine trigonometrical functions of the angles formed by a given reference direction with the variable direction of the wind.

19. In an anemometric device adapted for driving a driven device as a function of the speed and direction of the wind: a fixed hollow support; an anemometric head mounted on said support, orientable about an axis of rotation, and comprising a hollow cylindrical casing open from one end thereof to the other, the axis of this cylindrical casing being perpendicular to said axis of rotation, a wind wheel having a shaft, the axis of which is mounted to rotate freely in and about the axis of said cylindrical casing, and an anemometric head orienting vane pivoted on the latter; a reversible motor housed in said support to rotate said head; electromagnetic means for controlling the feed of said motor as a function of the oscillations of said orienting vane; a current modulating device disposed in said anemometric head and adapted to be operatively connected to the wind wheel to give electric pulses at a frequency which is proportional to the velocity of the wind parallel to said axis of rotation of said wind wheel; a frequency meter connected to said current modulating device and adapted for giving a voltage proportional to said frequency; a second reversible electric motor adapted for driving said driven device, and a servomechanism for driving the second motor in a manner depending on the voltage given by said frequency meter.

20. Anemometric device as claimed in claim 19, further comprising: a polarity reverser included in the feed circuit of said second motor, two relays for operating said reverser, a contactor controlling the circuits of these relays, and a cam fixed on the shaft from the anemometric head orienting motor and operatively connected to said contactor for changing the direction of rotation of said second motor according as the direction of the wind is to the left or to the right of a reference direction.

21. In an anemometric device adapted for driving a driven device as a function of the speed and direction of the wind: a fixed hollow support; an anemometric head mounted on said support, orientable about an axis of rotation, and comprising a hollow cylindrical casing open from one end thereof to the other, the axis of this cylindrical casing being perpendicular to said axis of rotation, a wind wheel having a shaft and the axis of which is mounted to rotate freely in and about the axis of said cylindrical casing, and an anemometric head orienting vane pivoted on the latter; a reversible motor housed in said support to rotate said head; a electromagnetic means for controlling the feed of said motor as a function of the oscillations of said orienting vane; a current modulating device disposed in said anemometric head and operatively connected to the wind wheel shaft to give electric pulses at a frequency which is proportional to the velocity of the wind parallel to said axis of rotation of said wind wheel; a frequency meter connected to said current modulating device and adapted for giving a voltage proportional to said frequency; at least a calculating device whereby the voltage given by said frequency meter may be multiplied by a parameter; a second reversible electric motor adapted for driving said driven device, and a servomechanism for driving said second motor in a manner depending on the voltage given by the frequency meter multiplied by said parameter.

References Cited in the file of this patent
UNITED STATES PATENTS

| | | |
|---|---|---|
| 1,779,783 | Sylvander | Oct. 28, 1930 |
| 2,067,413 | Plaisted | Jan. 12, 1937 |
| 2,346,864 | Packard | Apr. 18, 1944 |
| 2,373,247 | Jones | Apr. 10, 1945 |
| 2,455,345 | Watt | Nov. 30, 1948 |
| 2,579,344 | Sias | Dec. 18, 1951 |
| 2,592,583 | Lyon | Apr. 15, 1952 |